US005821508A

United States Patent [19]

Willard

[11] Patent Number: 5,821,508

[45] Date of Patent: Oct. 13, 1998

[54] AUDIO BALLOT SYSTEM

[75] Inventor: Jim Paul Willard, Gaithersburg, Md.

[73] Assignee: Votation, LLC, Chevy Chase, Md.

[21] Appl. No.: 772,911

[22] Filed: Dec. 24, 1996

Related U.S. Application Data

[60] Provisional application No. 60/009,528 Dec. 29, 1995.

[51] Int. Cl. [6] ........................... G07C 13/00; G06F 17/60

[52] U.S. Cl. ........................ 235/51; 235/50 R; 235/50 B; 235/54 F; 235/386

[58] Field of Search .................................... 235/51, 50 R, 235/50 B, 54 F, 386

[56] References Cited

U.S. PATENT DOCUMENTS

| | | | |
|---|---|---|---|
| 3,766,541 | 10/1973 | Gordon et al. | 235/52 |
| 4,015,106 | 3/1977 | De Phillipo | 235/54 F |
| 5,189,288 | 2/1993 | Anno et al. | 235/386 |
| 5,585,612 | 12/1996 | Harp, Jr. | 235/51 |
| 5,638,486 | 6/1997 | Wang et al. | 395/2.45 |

*Primary Examiner*—Michael L. Gellner
*Assistant Examiner*—Daniel Chapik
*Attorney, Agent, or Firm*—Burns, Doane, Swecker, Swecker & Mathis, L.L.P.

[57] ABSTRACT

An electronic voting system is disclosed that provides voters who may be blind, illiterate, or conversant in a foreign language, with a means to enter selection information without having to rely on visually perceptible information. In accordance with exemplary embodiments, candidate and/or referendum information is supplied audibly such that the voter can respond to selection options by speech input, actuating a button on a hand-held device, or other mechanism that permits the voter to indicate his or her selection preferences without having to visually interact with the system. The system provides an audio confirmation of the voter's selection. Such a system allows the aforementioned individuals to vote in confidence without assistance.

35 Claims, 10 Drawing Sheets

LEGEND

AUDIO BALLOT SYSTEM

RELATED APPLICATIONS

This application claims the benefit of U.S. Provisional application Ser. No. 60/009528 filed Dec. 29, 1995.

BACKGROUND

The present invention relates to electronic voting systems, and in particular, to an electronic voting system that supplies audibly detectable prompts and records selection input in a manner that avoids any need for visual interaction.

Manually intensive balloting systems, i.e., those requiring hand counting of votes, have largely been replaced by electronic or electromechanical voting systems. Such conventional systems provide candidate and/or referendum type information in one of a variety of graphic forms that allow a voter to read the information and make selections in conjunction with the graphic presentation. For example, a popular electromechanical system used in many precincts involves supplying a voter with a computer-interpretable punch card that is used to record a voter's selection information. When the voter enters the voting booth, the card is inserted into a pocket, or slot, that secures the card in place. The slot has a variety of holes positioned over detachable punch tabs in the punch card. Candidate and/or referendum information is displayed next to the holes. To make a selection, the voter inserts a peg, or like device, into the hole aligned with his or her selection to detach the punch tab on the punch card that corresponds to the selected candidate. When voting is completed, the voter drops the punch card into a collection box. The cards are returned to a central location and fed through a punch card reader to tally votes.

A conventional electronic voting system may involve providing the voter with a full-face printed ballot on a plastic sheet. A full-face ballot is one wherein all candidate and referendum information is simultaneously provided such that no candidate or issue gains a particular advantage by virtue of its arrangement on the ballot. The sheet is mounted over an array of electromechanical or like switches and corresponding LEDs. Candidate and/or referendum information is provided such that press-points designated on the ballot face, corresponding to selecting a candidate and/or position on a referendum, are aligned over the electromechanical switches. Next to each press-point is a hole that receives a corresponding LED. When a voter enters a booth to vote and starts the voting process, the LEDs next to the press-points begin to flash. When the voter depresses a press-point next to his or her selection, the corresponding LED is turned on and stays on, thereby designating the selection, while the LEDs corresponding to the non-selected candidates are turned off. After the selections for each office and/or referendum have been selected, only the LEDs next to the selected items remain illuminated. The voter then strikes a "VOTE" button to electronically record the selections. The recorded information is typically recorded locally on a computer readable disk, or like memory, that is later returned to a central location for tallying.

The drawback of conventional voting systems described above, and others like them, is that a voter is required to interact visually with the system to make a selection. That is, the voter must rely on a graphical presentation of candidate or referendum information. Typically, this involves printing the names of the candidates, or the text of a referendum, on a ballot. Voters can make a selection only by taking action that involves interacting with the graphic presentation, such as pressing a button that is located next to a candidate's name. Consequently, individuals that are visually impaired, or are illiterate, are greatly disadvantaged. For instance, sight impaired voters must rely on the assistance of a poll worker or relative/friend (if they are allowed to enter the polling booth) to vote. This compromises the confidentiality of the voting process for these individuals and fails to ensure that a voter will select a candidate or referendum position which is actually his or her true choice. In the case of illiterate individuals, the prospect of embarrassment, or knowing that they will not be able to vote effectively, may result in their avoiding voting altogether.

In response to the foregoing problem, a system using Braille punch cards has been proposed. However, this system has been found to be only partially effective. Many sight impaired voters lose their vision later in life due to degenerative conditions or disease. However, Braille is typically taught to individuals who are congenitally sight impaired, or who lose the effective use of their vision early in life. It has been found that teaching Braille to an individual who has lost their vision later in life is largely ineffective either because the individual does not want to learn Braille, is no longer teachable, or has not developed the tactile facilities and sensitivity required to read Braille. Consequently, a Braille voting system has been found to be limited in its effectiveness.

Few conventional systems supply a voter with any audio responses. Some systems may indicate an audible alarm at the completion of an individual's voting process to notify poll workers to escort the voter from a booth and escort a new voter to the booth. Another conventional system that provides an audio signal to assist a voter is described in U.S. Pat. No. 5,377,099 to Miyagawa. Miyagawa principally involves supplying a high-definition display unit for graphically depicting candidate information. The voter interacts with the display either to select a candidate, or to procure additional candidate information. Interaction is achieved by use of a graphical user interface (GUI) involving a hand-held pen that is pressed against the display. A tablet having an inlaid grid of transparent wires is overlaid onto the display, whereby the system can sense the position of the pen relative to the display. Miyagawa also describes providing speech guidance. However, the extent of such guidance is limited to directing a voter to enter a selection by interacting with the display. Hence, visual interaction is still required to successfully enter a selection. While the speech guidance includes announcing candidate names, the voter is still forced to enter all selections through the pen/display interface. Consequently, sight impaired and illiterate voters would still require assistance to vote using Miyagawa's system.

Accordingly, a need exists to provide a voting system that permits sight impaired or illiterate voters to select candidates and/or decide on referendum-type issues in a manner that does not require a graphical provision of ballot information or a visually-interactive response thereto. It is also desirable to provide such individuals with a means to vote whereby they can maintain his or her selections in secret. It is worth noting that some states are considering legal cases, brought by organizations representing sight impaired persons, to require that the states provide a system that permits sight impaired individuals to have equal and confidential access to the voting process.

SUMMARY

The present invention overcomes the foregoing disadvantages by providing an audio ballot system. An audio ballot system in accordance with the invention provides a voter with an audibly perceptible prompt indicating candidate and/or referendum information, and also provides the user with a mechanism that allows the voter to make a selection without having to interact visually with system graphics. An exemplary arrangement involves providing a voter with a hand-held voter input unit having one or more switches. Each of the switches may correspond to a selection indication such as "YES" (to select an announced candidate) and "NO" (to reject an announced candidate). If the voter selects the announced candidate, the system proceeds to a next race, if the voter rejects the announced candidate, the system proceeds to a next candidate or supplies a write-in option, if allowed. In another exemplary arrangement, a voter can give an audible indication of his or her selection or rejection by saying "YES" (to select an announced candidate) or "NO" (to reject an announced candidate), respectively into a microphone connected to a speech recognition system or voice recorder.

Generally speaking, an electronic voting system incorporating the present invention includes a first means for audibly providing a voter with ballot choices; a second means for permitting the voter to indicate a selected ballot choice in a manner which does not require visual interaction; and a third means, responsive to the second means, for recording the selected ballot choice. In an exemplary process the invention involves audibly providing a voter with ballot choices; permitting entry of a selection in response to the ballot choices in a non-visually interactive manner; and recording the response.

In accordance with another aspect of the present invention, the audio ballot system can utilized in concert with an existing system. Candidate and/or referendum data is provided by audible announcement and voters respond to the announcement without having to interpret visual information. Voter selection information captured during the voting session is translated into a format that conforms with the requirements of the existing system. This may involve generating a punch card or an optically scanable form. Or in a case where a stand alone booth is connected to, or stores an output on a computer-readable medium, may involve generating a signal or data item that is formatted in accordance with the voter data storage requirements of the existing system. Consequently, a stand alone audio voting booth can provided for complimenting an existing system thereby allowing blind, illiterate, or even non-english speaking voters to vote wherein the product of the voting is produced in a form that can be interpreted and recorded by the existing system.

In accordance with yet another aspect of the invention, voting data is stored in a fashion that permits the detection and correction of data that has been altered, or otherwise tampered with. This permits the reconstruction of accurate voter data in the event that tampering takes place. In addition, an audit log is preferably kept that records all activity occurring in the system along with time stamp information. The audit log permits officials to review all voting, system and alarm activity that occurred during the election thereby providing a mechanism for proving that the voting system was operating correctly at the time the vote was recorded. If there is interference or tampering, the system will record alarm conditions or other system access activity in the audit log.

In still another advantage provided in accordance with the present invention, a voter can select a language in which all candidate and/or referendum information is to be provided. Providing a voter with information in this way is far less cumbersome than preparing and supplying printed information in a variety of different languages.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

Figure 1:
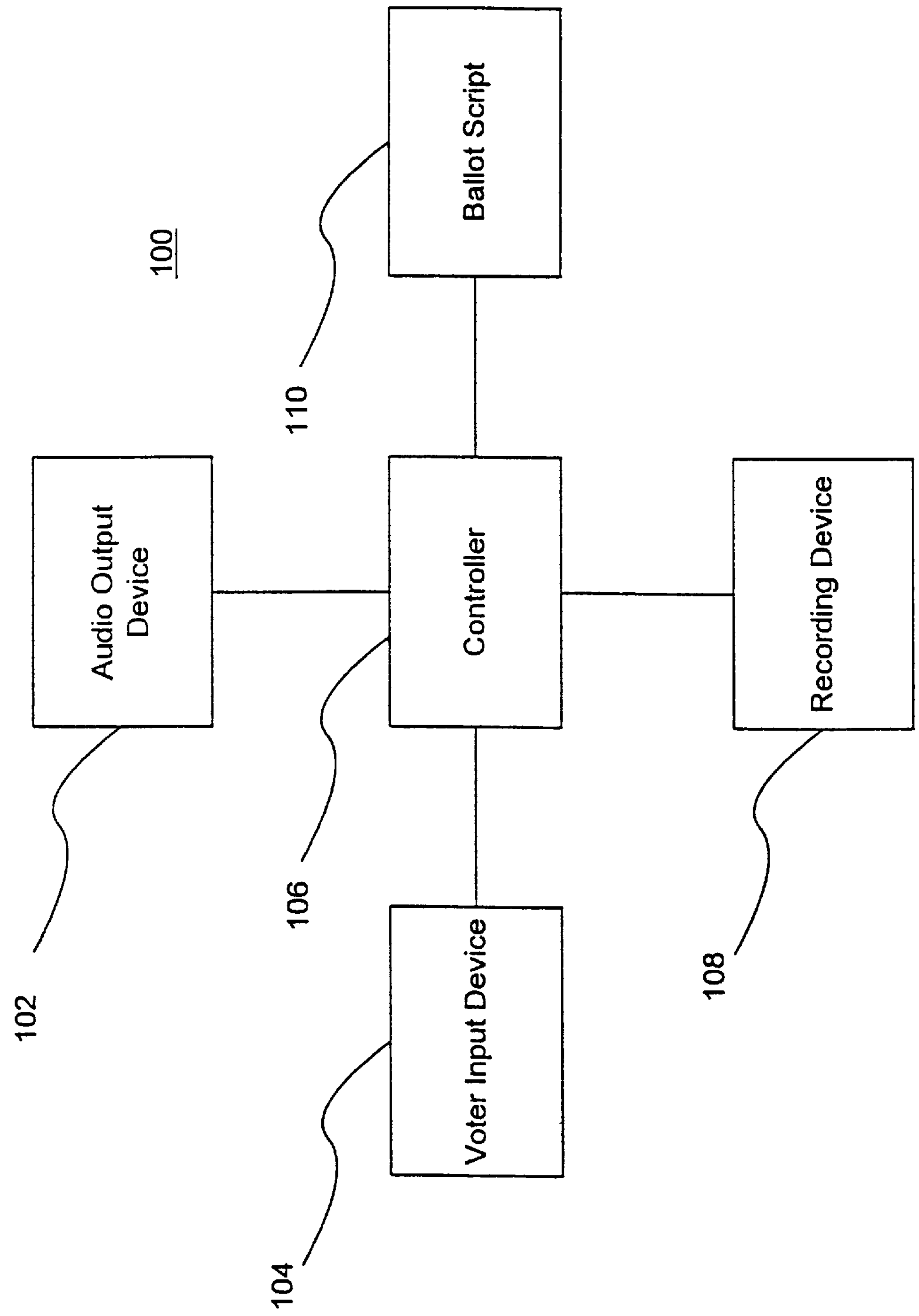
FIG. 1 depicts an exemplary arrangement in accordance with the invention.

FIG. 1 depicts an exemplary audio ballot system 100 in accordance with an embodiment of the invention. An audio output device 102 supplies an audibly perceptible signal to a voter. The voter can respond to the output generated by the audio output device 102 using a voter input device 104. The voter input device 104 is designed to provide the voter with the capability to enter selection information without having to interact visually with the system. This can be achieved, for example, by embodying the voter input device 104 as a hand-held switch, or as a voice recognition device. Output generated by the voter input device 104 is received by a controller 106 which formats the data, as needed, for storage in a recording device 108. A ballot script 110 is included that contains election-specific candidate and/or referendum information that is either supplied directly to the audio output device 102, or to the controller 106 for subsequent output to the audio output device 102. The controller 106 performs general control functions for coordinating generation of audio output, receipt of voter input, and formatting and storage of voter input. It will be recognized by those skilled in the art that any number of component arrangements and interconnections can be utilized to build the controller.

The audio output device 102 can be embodied in a variety of forms in accordance with exemplary embodiments of the invention. For instance, a voice synthesizer can be used to generate audio output. Such a voice synthesizer can be of the variety found in general purpose personal computers about which the audio ballot system can be constructed, or the voice synthesizer can be part of a customized hardware arrangement. In accordance with a preferred embodiment, the audio output device is a simple audio player that plays recorded information supplied by the ballot script 110.

Output supplied by the audio output device 102 can be generated through use of a loudspeaker, or through headphones, or a like personal listening device. In order to provide privacy in conducting the voting process, an arrangement using a loudspeaker preferably involves use of a soundproof voting booth. However, the latter may be cost prohibitive. Hence, it may be preferable to use headphones to supply voters with audible candidate and/or referendum information.

As mentioned briefly above, output supplied by the audio output device 102 can be supplied in a variety of languages. Accordingly, a first step in the voting process has a voter select a language using a voter input device. The voter input device is an important aspect of the present invention. A voter input device in accordance with the invention provides a voter with a mechanism or method for indicating his or her selections in a non-visually interactive manner. That is, the voter input device provides the voter with the capability to enter his or her selection or indication without having to respond to any visual cues, graphic symbols, or printed indications. Accordingly, the voter input device is preferably embodied as a hand-held device, a speech recognition device, or other like, non-visually interactive, means.

In one exemplary embodiment, the voter input device is a hand-held control device having one or more switches in the form of keys or buttons. The number of switches may depend on the particular scheme used for supplying audible candidate/referendum messages to the voter. For instance, in a timing-oriented scheme, the voter may be provided with a predetermined time period, following announcement of the candidate's name, in which to indicate his or her selection before a next candidate is announced. In such a situation, only a single button voter input device is needed wherein the voter presses the button during the predetermined time period to indicate selection, for example, of the announced candidate. In accordance with another exemplary arrangement, "YES" and "NO" keys can be provided wherein the voter accepts or rejects the candidate before a next candidate is announced. Alternatively, several numbered keys, each of which corresponds to a candidate, can be provided wherein a voter indicates his or her selection by striking an appropriate numbered key.

The key or keys on a hand-held input device can have distinctive tactile characteristics whereby a voter can distinguish one key from another. The tactile feature can be a Braille character, or other shape formed on the key's surface, that corresponds to the key's identity and/or function. The entire key can even be shaped to correspond with its meaning. For instance, the key can be configured in the shape of an "N" for no, or a "Y" for yes. Of course, a tactile form can be located next to a key. For example, using Braille characters, the function of the key can be spelled out at a position adjacent to the key.

Figure 2:
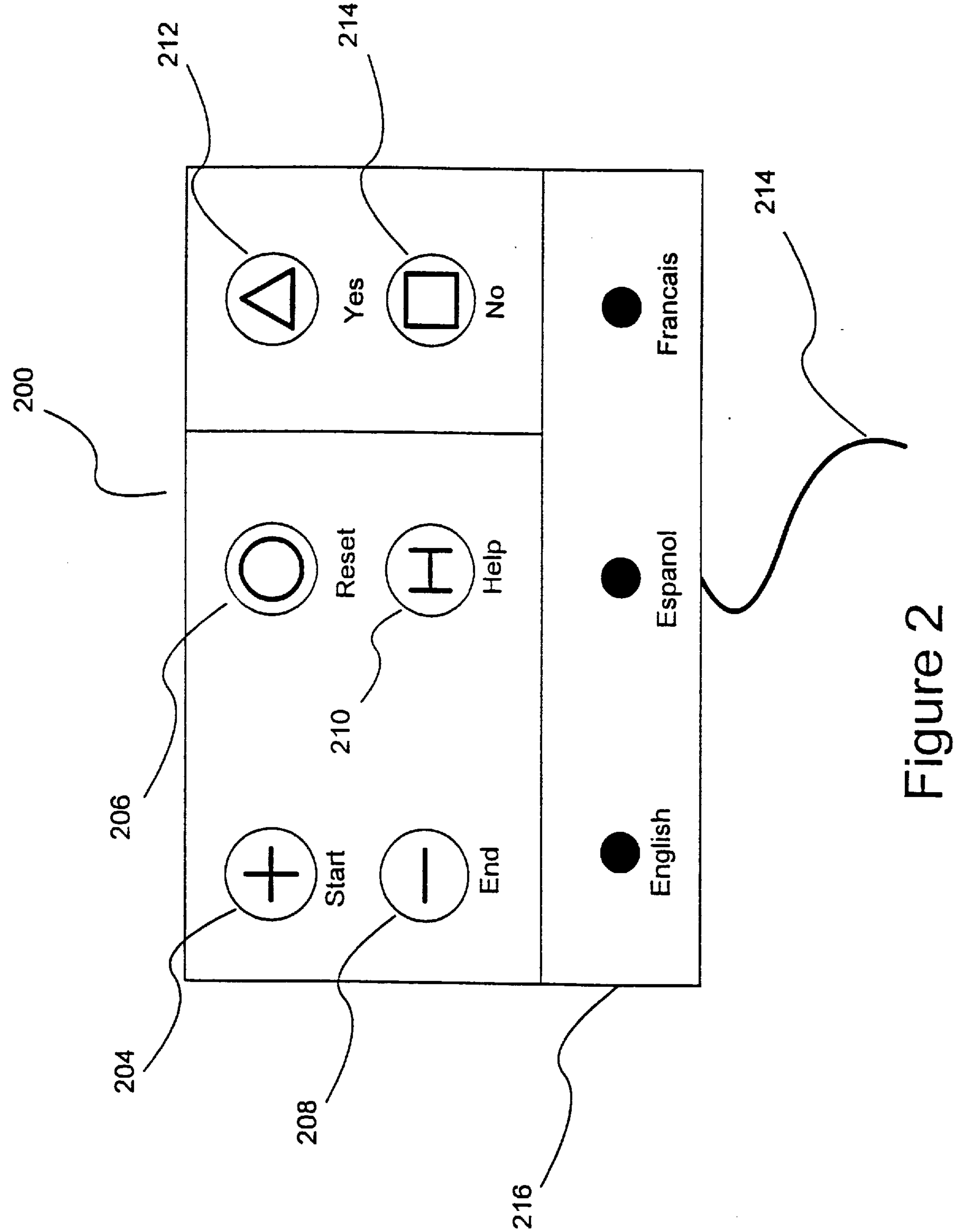
FIG. 2 depicts an exemplary voter input device in accordance with the invention.

FIG. 2 depicts an exemplary hand-held device 200 in accordance with the invention. The voter input device 200 has a plurality of keys, each of which correspond to a certain function. A signal generated by striking any one of the keys is transmitted via a connection line 202. The keys on the voter input device 200 can include a start key 204 for initiating a voting process and an end key 208 for concluding the voting process. During the voting process a voter can elect to start over by pressing a reset key 206, or seek assistance by pressing a help key 210. Entry of a favorable indication in response to a candidate or a referendum position can be made by pressing a yes key 212, while a negative indication is made by using the no key 214. A language for use in supplying the audibly detectable candidate and/or referendum information can be selected by pressing an appropriate key in a language selection section 216. Alternately, the yes key 212 can be used to affirmatively indicate a language preference when a desired language is announced. As depicted, the keys can have distinctive shapes to further identify a function to a voter. Alternatively, or in addition, the keys can have raised Braille characters (not shown) located adjacent to the keys.

In accordance with another exemplary embodiment of a voter input device, a voter can supply a response in the form of speech. In such a case the voter input device can include a microphone to capture the voter's spoken selection responses, and a speech recognition device for interpretation of the responses. The speech recognition device functions to interpret the response and then supply the interpretation to the system for selection recordation. The speech recognition device can operate by comparing a voter's digitized audible response to pre-recorded waveforms corresponding to candidate names, or can perform a recognition process to interpret the response thereby determining which candidate is selected. In accordance with an exemplary embodiment, a voice recognition system in accordance with the invention can be simplified by calibrating the system to a voter's voice response. This can be done in at least one of two ways. In one manner, the voter can be prompted to give a favorable indication (e.g., an announcement "PLEASE SAY 'YES' INTO THE MICROPHONE" is made) and/or a negative indication, wherein the system temporarily records the voter's speech waveforms corresponding to the responses. The waveforms can then be used for later comparison to audible yes/no selection responses supplied by the voter. In a second scenario, the voter can be prompted to say a variety of sounds or words to calibrate the system to the user's particular phonetic speech characteristics. Once calibrated, the system may be more capable of recognizing the voter's response which can be, for example, a candidate's name. Speech recognition devices and techniques are well known to those skilled in the art and are not discussed further here. Use of a vocal response to enter a selection is not limited to use of a speech recognition device, however, for example, a voter's audible responses can simply be recorded by the system for later interpretation and tallying.

In accordance with another exemplary aspect of the audio voting system, a sight impaired or illiterate voter is provided with a capability to supply a "write-in" candidate name in response to a prompt. Consequently, illiterate voters who presumably cannot write, and blind voters, are afforded the opportunity to enter non-ballot candidates. Such a capability requires the provision of an audio response input device (i.e., a microphone). An option to enter a write-in candidate can be provided after the system has supplied all of the regular candidates without receiving a selection indication from the voter. If the voter affirmatively indicates that they would like to enter a write-in candidate name, the system may prompt the voter to say the candidate's name into the microphone following provision of a begin-recording tone. The system, in handling the write-in process, can use a voice recognition device, or invoke an audio recorder, immediately following the prompt and begin-recording tone to record the voter's response. This information can be collected and stored as an analog waveform (i.e., pure recording) or digitized and stored using a voice recognition system.

Voter responses entered into the system by a voter are stored in the recording device 108. The device may be located locally, e.g., within a memory in the system, or located in a remote location, such as a central tallying center. Multiple memories can be used to redundantly store the same information as will be described in greater detail below. The memory used to store the data can take the form of any of a variety of computer readable types such as tape, disk (hard or floppy), RAM, and/or CD-ROM.

As briefly mentioned above, candidate and/or referendum information provided to the voter via the audio output device 102 can be supplied by the ballot script 110. The ballot script contains recorded information that is specific to a particular election. For example, the script can contain the names and parties of candidates and descriptions of referendum issues. The ballot script 110 can be provided by supplying the voting precinct with a computer readable memory device, such as a floppy disk, that contains the information. Alternatively, the information can be downloaded to a voting booth, or a computer terminal attached thereto. The script ballot can also contain election specific control information for permitting the voting process to proceed according to a prescribed sequence.

An audio ballot system incorporating the invention can be constructed around a general purpose computer having an appropriate program running thereon. Alternatively, in a hardware-specific system, i.e., a hardware arrangement specifically designed to provide an audio ballot voting function, a microprocessor-based system, or an ASIC-based system can be employed. The system control logic coordinates processes such as the sequence of information presentation, coordinating speech generation, timing for receipt of input, and recording of input. Referring to FIG. 1, for instance, the controller 106 can initiate provision of audible candidate/referendum information from the audio output device 102 by relaying information from the ballot script 110. The controller then monitors the voter input device 104 for a selection indication, formats selection information in accordance with storage requirements, and then submits the formatted information to the recording device 108 for recording.

Figure 3:
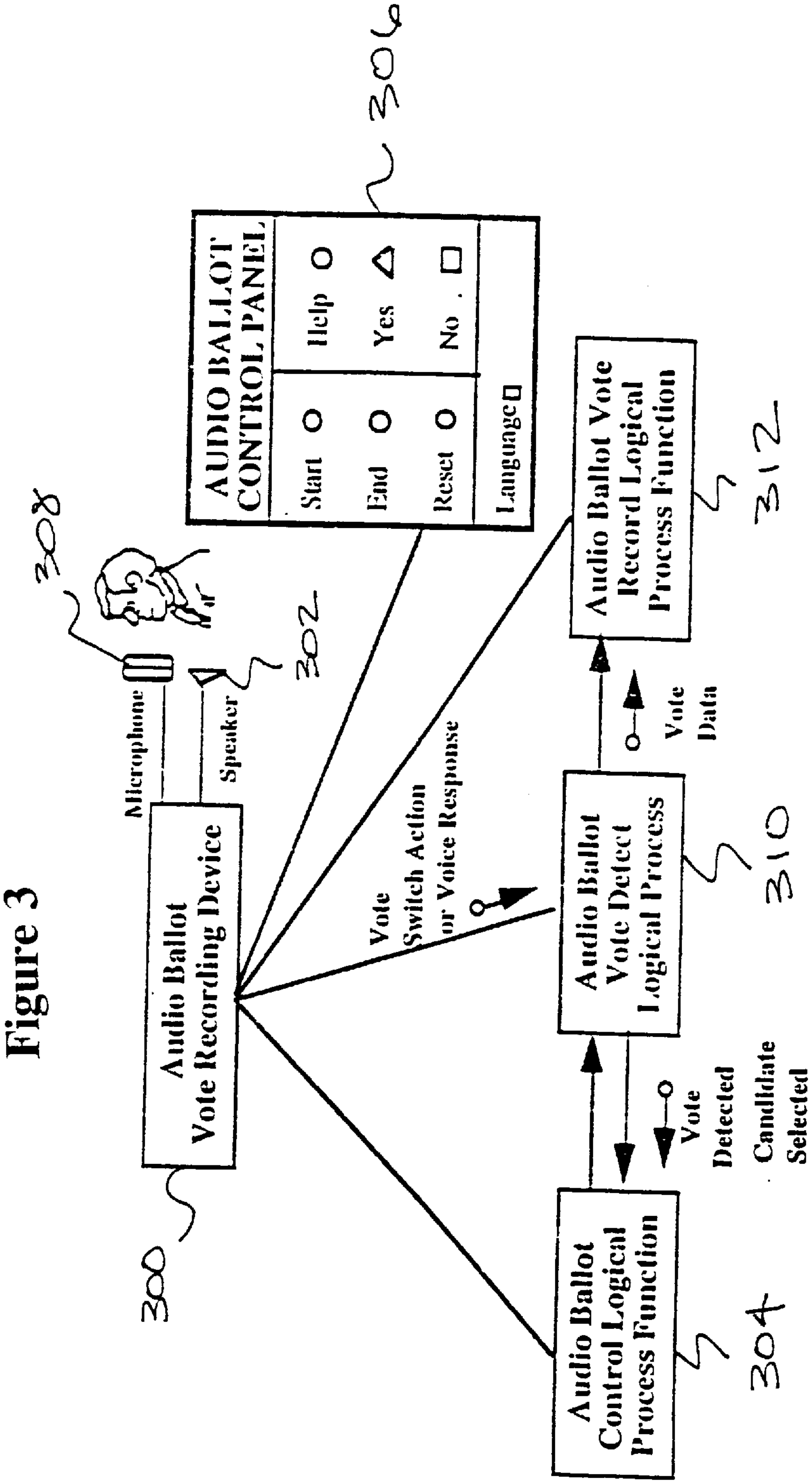
FIG. 3 depicts another exemplary arrangement in accordance with the invention.

Another exemplary arrangement for providing an audio ballot system, is depicted in FIG. 3. An audio ballot and vote recording device 300 generates a signal for audio presentation of race information through a speaker 302. The audio presentation is controlled by audio ballot control logic 304. The audio ballot control logic 304 may be embodied in the form of a general purpose computer and accompanying computer program, or other device that can perform logical processing functions to control audio output, detect voter input, and process and record the input in a secure and accurate manner such that the recorded data may be verified if necessary. An audio ballot control panel 306 is provided as a voter input interface to the system. The control panel 306 includes a variety of electromechanical switches that permit the voter to interact non-visually with the audio ballot system. The audio ballot control panel 306 is not unlike the voter input device described above with respect to FIG. 2. In the exemplary embodiment depicted in FIG. 3, a microphone 108 also is provided to capture a voter's spoken input. Whether supplied through the control panel 306, or through the microphone 308, input is detected by vote detection logic 310. The vote detection logic 310 detects the voter's input and signals the audio ballot control logic 304 with the voter's selection. This causes the audio ballot control logic 304 to present a next candidate choice or proceed to a next electoral race. The vote detection logic 310 also transmits the vote selection to vote record logic 312 where the vote data is recorded. If the voter chooses a write-in candidate, the voter input indicates a write-in option (that may be announced after the regular candidates have been presented) which involves having the voter say his or her write-in candidate's name into the microphone 308 whereafter the voter's voice input is stored by the vote record logic 312.

Figure 4:
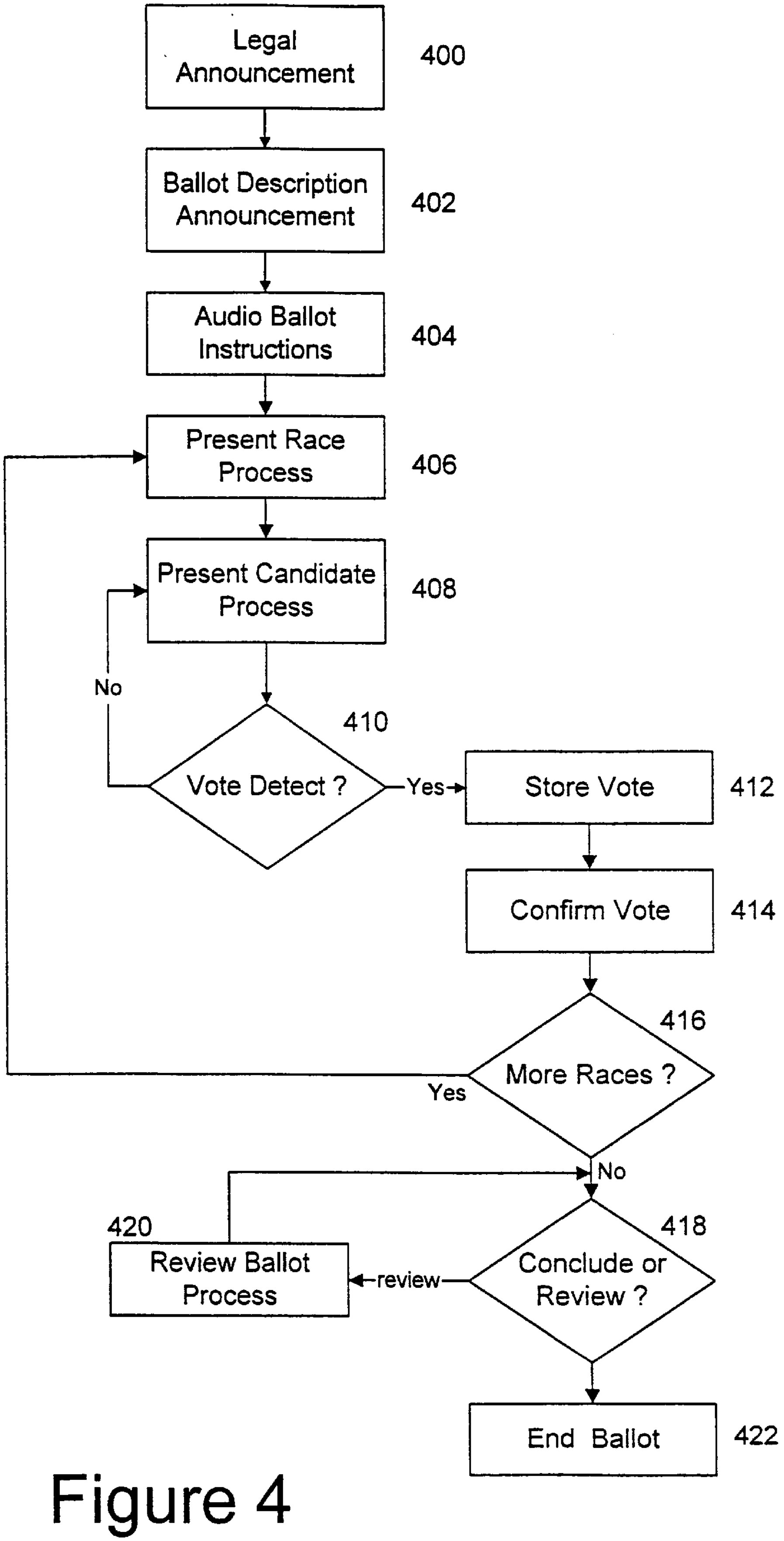
FIG. 4 depicts an exemplary process in accordance with the invention.

An exemplary process for conducting a voting operation in accordance with the invention is depicted in the flowchart shown in FIG. 4. The exemplary process begins with a legal announcement (step 400) that includes specifics of the election being held, such as the election type (primary, general, special, etc.), the state and precinct, the ballot style, and other information that, according to the particular jurisdiction, may be required to be presented to the voter. A ballot description announcement (step 402) is an overall description of ballot information (i.e., candidates and referendum issues) that is intended to give the voter advanced information concerning the number of races, candidates in those races, referendum issues that comprise the election, and otherwise mentally prepare the voter for the act of voting. It is intended that this announcement have the effect of presenting to the voter the basic information that a sighted voter would derive from observing a "full-face" ballot that is required in some political jurisdictions. A full-face ballot is a ballot in which all races and all issues are presented visually to the voter at once on a single ballot. The purpose is to not prejudice the voter to vote any particular way because of the ballot arrangement or presentation. The ballot description announcement (step 402) replicates this visual presentation through provision of an audio speech announcement that conforms, in effect, to the requirements of a full-face ballot presentation.

Audio ballot instructions (step 404) describe to the voter how the audio ballot operates and what actions must be taken to make a selection (e.g., how to operate a voter input device). If an audio input response is provided, the voter may be asked to supply a "YES" and "NO" spoken response that is recorded to calibrate the system in anticipation of affirmative and negative voter inputs supplied during the voting process. At the conclusion of the instruction announcement (step 404) voting begins. The audio ballot announces a first candidate race by initiating a race presentation process (step 406). This announcement provides the race (President, Governor, etc.), and announces the party and name of each candidate in the race. If a write-in vote is allowed, the announcement indicates that this option is available (e.g., "A WRITE-IN VOTE IS PERMITTED IN THIS RACE"). The audio ballot then offers the first candidate for the race being voted by performing a present candidate process (step 408). Presentation of a candidate during the present candidate process may involve controlling the audio output device to announce: "IF YOU WISH TO VOTE FOR (candidate name), DEPRESS THE 'YES' BUTTON (or say 'yes') NOW". Immediately following the announcement, the system initiates a timer to clock a receiving interval during which a vote detect process (step 410) is activated. This process waits a predetermined length of time to detect the voter's selection indication of "YES" or "NO". If a "NO" indication is detected, the system immediately loops back to present a next candidate. If no vote action is detected within the timing window, the system can either reprompt the voter to enter a response, or can assume that the voter does not intend to select the previously announced candidate and loop back to the present candidate process (step 408) to announce a next candidate in the race. If a last candidate has been announced and the voter has not yet indicated a choice, a write-in option can be announced, if allowed, whereby the voter is permitted to announce his or her write-in candidate during a recording window. In some races, more than one candidate may be voted for. If this is the case, appropriate instructions are provided during the present race process (step 406), e.g., "VOTE FOR NO MORE THAN TWO OF THE CANDIDATES FOR SCHOOL BOARD," and the flow process is adjusted accordingly whereby the system presents candidates in a fashion that allows the maximum number of allowed votes to be recorded.

When a vote input indication is entered during the detect vote process (step 410) the system detects the vote indication (e.g., by voice or switch activation) and initiates a store vote process (step 412). Logical processing can be included in the store vote process to assure the accuracy and integrity of the of the information stored. Such processes are discussed in greater detail below. Following storage of the vote information, the voter is given a confirmation of his or her vote (step 414) by audibly announcing the voter's choice by issuing an announcement such as, "YOU HAVE VOTED FOR ________ IN THE RACE FOR ________". The process then determines whether there are any remaining candidate races or referenda on the ballot (step 416). If so, the process proceeds to present the next race (step 406). If there are no remaining candidates or issues/referenda to be decided by the voter, the voter is offered a choice of either concluding the voting session or reviewing his or her vote selections (step 418). Reviewing is provided by a ballot review announcement process (step 420) wherein the voter can be given the opportunity to change any one of his or her selections using existing processes (e.g., present candidate process step 408). At the conclusion of the review, the voter is returned to the review or conclude option (step 418). If the voter chooses to conclude voting, an end ballot process (step 422) is initiated whereby the voter provides a positive conclusion to the voting session. At this time, additional processing may be performed to record a voter's votes and an announcement is made informing the voter of the conclusion of the voting session. It will be appreciated by those skilled in the art that the foregoing sequences can be altered or rearranged in a variety of ways to achieve the desired result of permitting a voter to non-visually enter, confirm, and/or change his or her selections.

Another aspect of a system incorporating the invention, involves providing an audio ballot system as a stand-alone system that can supply voting data in a format that complies with the requirements of an existing system. For example, in a punch card system like that described in the Background section above, a stand-alone audio ballot booth can be provided that has the ability to receive voter input in a non-visually interactive manner, which booth generates a punch card that reflects a voter's choices. The punch card can subsequently be deposited in a collection container for later tallying. In another arrangement, the stand-alone booth may generate an optically scanable form that conforms to the output of an existing voting system. Alternatively, the stand-alone booth can generate an electronic signal, or store voting information to computer readable memory, in a form that comports with the formatting requirements of an existing electronic voting system. Optionally, the stand-alone system can be connected into an existing system and supply voter data directly, which data has been translated into a form that conforms to the existing system's formatting and storage requirements. As a result, an audio ballot voting booth, in accordance with the invention, can be set up in a voting precinct station that uses an otherwise conventional system. In this way, a jurisdiction wanting to provide an audio ballot system need only procure enough stand-alone audio ballot booths to satisfy its requirements, rather than replacing the entire existing system.

In accordance with yet another aspect of the invention, voter data is stored in a format that renders the data resistant to tampering. In accordance with preferred embodiments, tampering can be detected and true data recovered from the tampered data. Details of this storage technique are set out in commonly assigned co-pending U.S. application Ser. No. 08/272,068 entitled: "Remote Recording Computer Voting System" and commonly assigned co-pending U.S. patent application Ser. No. 08/619,457 entitled "DATA COLLECTION SYSTEM" which are incorporated herein by reference in their entirety.

Voter data and system events are processed and stored during system operation in the form of individual voter record data and audit trail data, respectively. Such a feature provides for ensuring that a system was properly functioning at the time a vote was cast and that the vote data is, in truth, what the voter actually intended. Detection of abnormalities can be achieved by evaluating the audit trail, which records alarm states reflecting illicit system access, and/or by performing a detect and correct process.

Conventional voting machines provide data integrity through redundant memory data storage. While the present system also preferably utilizes redundant data storage, this technique alone, without definitive processes to specifically define how differing data is resolved, is incapable of recovering accurate data. Consequently, conventional systems lack full integrity. Accuracy and integrity of voter data recorded in the audio ballot system is assured through the use of data processing mechanisms that produce stored voter data that can be checked for integrity, and if found to be altered, reconstructed to recapture the voter data.

Raw voter data and system event data stored in accordance with the present invention is formatted to include a data header, a data type, and word parity information for each word or byte of saved data. In addition, one or more checksums corresponding to the header, the voter/system data, and combinations thereof and other stored data elements, can be added to a stored record (i.e., the formatted record that is finally stored to memory).

Figure 5A:
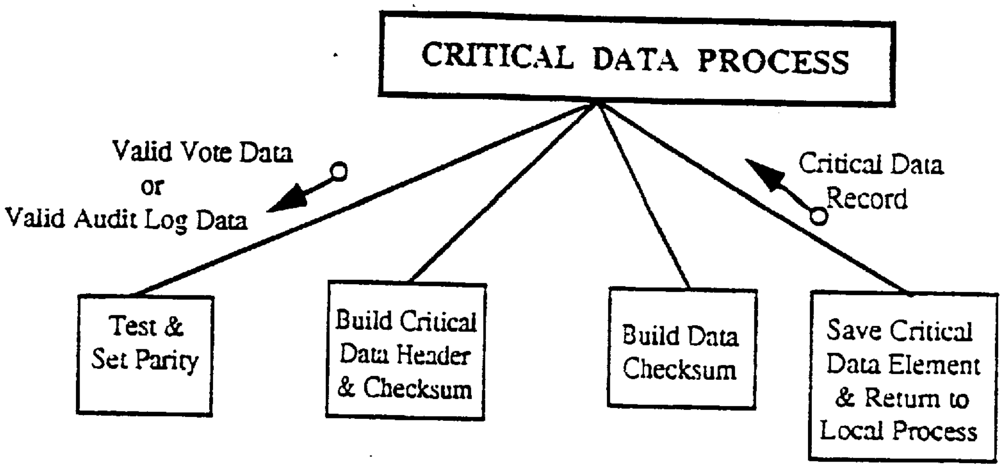
FIG. 5A depicts a critical data process for storing system and voting event data in accordance with aspects of the invention.
Figure 5B:
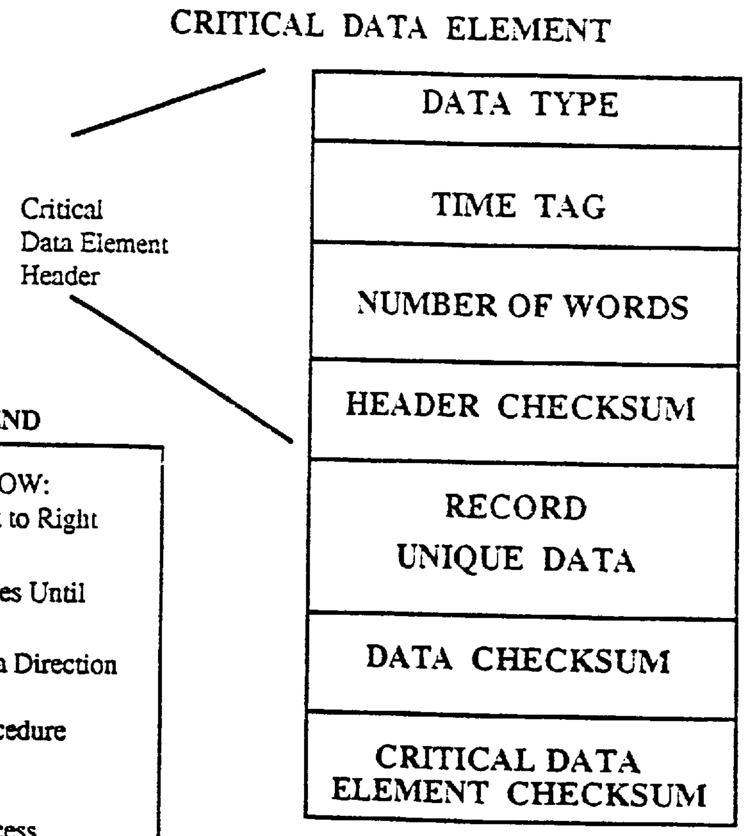
FIG. 5B depicts an exemplary data format for data to be stored.
Figure 5B:
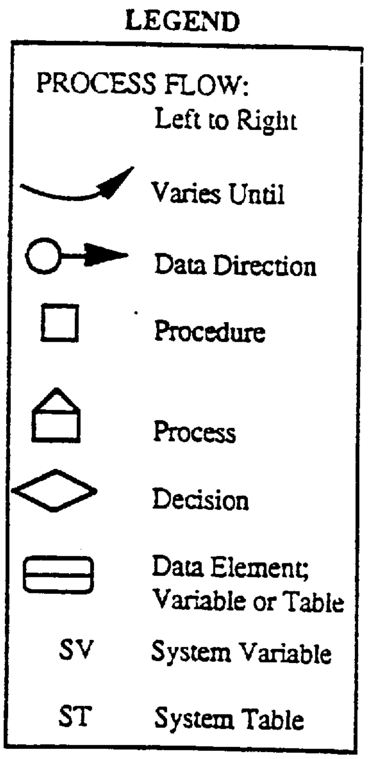
Figure 6:
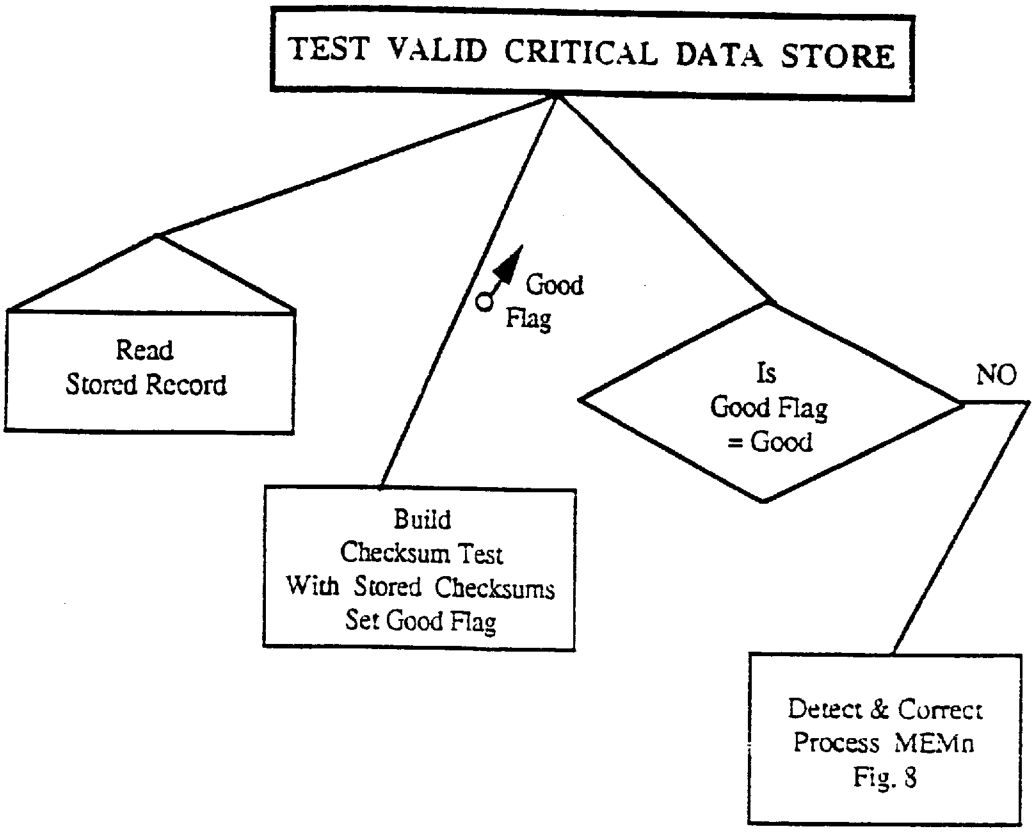
FIG. 6 depicts an exemplary process for testing the validity of a critical data store.
Figure 6:
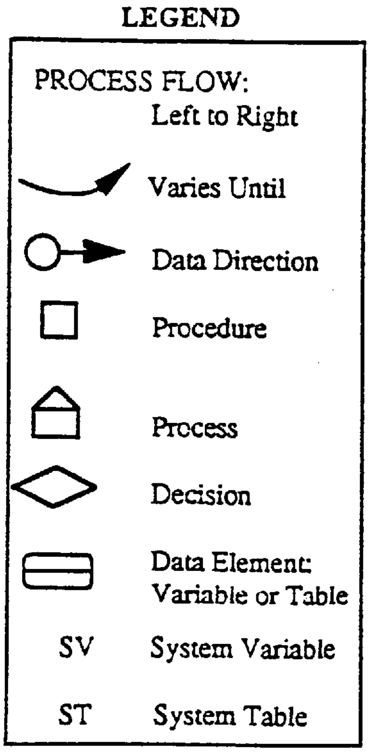

An exemplary data processing method is depicted in FIG. 5A which shows processing performed to produce a header and checksum data for a stored record in the form of a critical data element shown in FIG. 5B. FIG. 6 illustrates a test valid data method that uses verification processes to check the accuracy and integrity of stored data produced by the aforementioned processing methods. The combination of header data, parity, and multiple checksums assists in ensuring that the stored data is accurate and true. If a data error were to occur, the combination of data elements is used to detect the data that is incorrect and repair the incorrect data.

Figure 7:
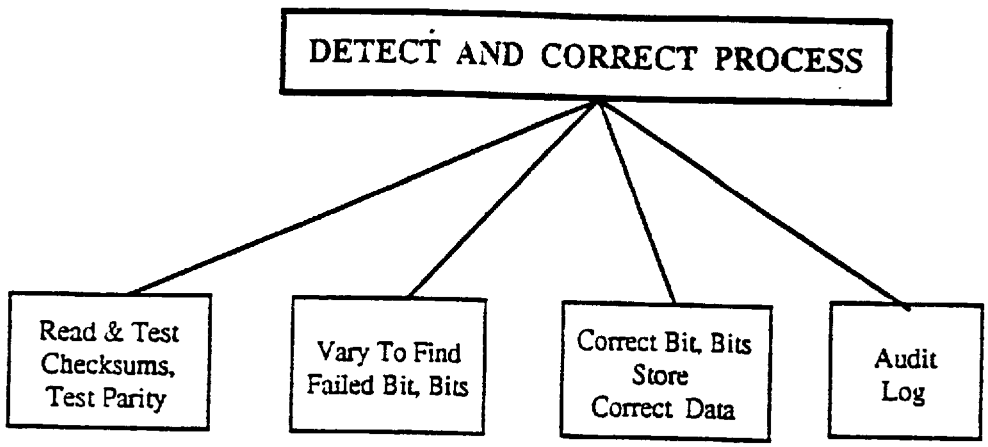
FIG. 7 depicts an exemplary correct and detect process in accordance with another aspect of the invention.
Figure 7:
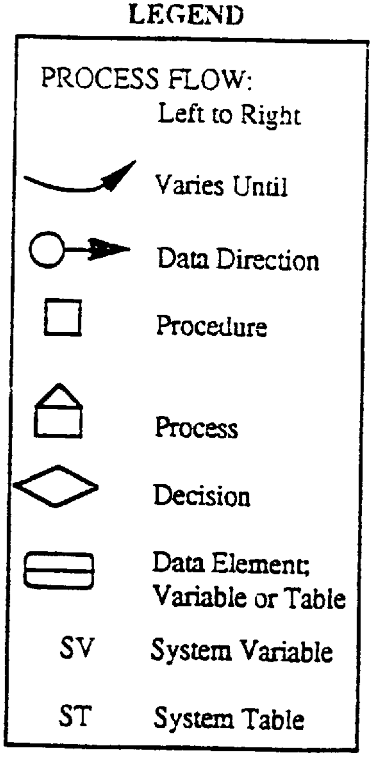

FIG. 7 depicts a detect and correct process performed to correct stored data errors. The process used to detect and correct the voter record is a functional process similar to "bit detect and correct" processing that is commonly used in data communications processes to fix "dropped bits". The technique of detecting erroneous data involves generating a checksum on, for example, raw voter data. The checksum corresponding to the raw data is later regenerated from stored data and compared to a data checksum originally stored for the raw data. If there is a mismatch, it is indicative of erroneous data. Correction of the data involves generating and storing a parity bit for each byte of raw data. During correction, regeneration of parity bits for each byte of raw data of associated with the erroneous data is performed. A byte that is erroneous is located by comparing regenerated parity bits with parity bits previously stored for the byte. Once located, each of the bits in the byte are varied and the checksum recalculated until the data checksum calculation results in a recalculated data checksum value that is equal to a data checksum value previously stored for the raw data. Thereafter, the located byte in error is replaced with the altered byte that results in a data checksum match. This feature, incorporated within this invention together with the specified voter record content and the methodology used to tally election totals, provides an accurate and secure election system. These techniques are used throughout the system for any process that stores, reads, or uses critical data.

In accordance with yet another aspect of the invention, an audit trail is maintained wherein system activity is systematically recorded in a manner that permits unusual activity to be revealed. An audit trail log is continuously updated and contains records of each system event that occurs in a time ordered sequence. Audit trail data is recorded just as voting data is recorded thereby permitting its reconstruction in the event of tampering. However, rather than raw voter data, the audit trail records system codes, or like information, identifying the system event involved. A data type indicator distinguishes a voter data record from an audit trail record. Audit data is also preferably stored in multiple data memories.

Figure 8:
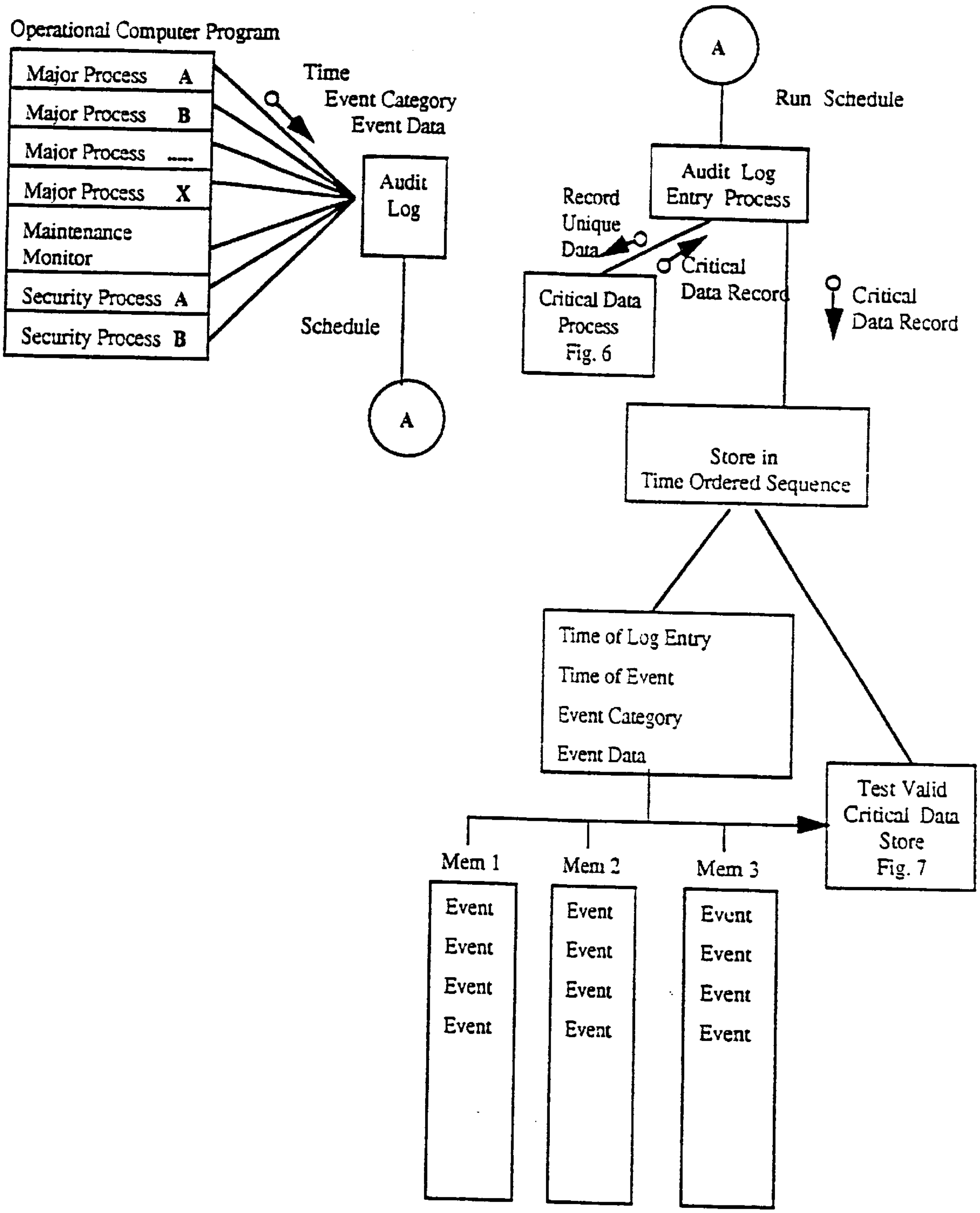
FIGS. 8 and 9 depict exemplary processes for constructing an audit log.

FIG. 8 depicts an audit trail processing functional block diagram whereby system event data is processed and logged. The logged data provides a mechanism whereby the complete operation of the system can be reproduced and the system's proper or improper operation confirmed. The audit trail is a time ordered digital recording of each system event that occurred during the election. A system event can include: (1) system start time, (2) operator commands, (3) test results, (4) start vote, (5) key card number issued, (6) key card number used, (7) electronic ballot input data, (8) voter start vote and stop vote time, and (9) external commands from higher level elements if they are used. Additionally all required operator inputs, such as system alert and failure detection responses, are logged. The system event data that can be recorded as audit log entries also include, but are not limited to:

A. Time of log entry

B. Time of event occurrence

C. Event category

1.) System Turn On

2.) Ballot Access

3.) Ballot End Access

4.) Vote Entry, Vote Confirmation Commanded

5.) Operator Entry

6.) Maintenance Monitor Entry

7.) Failure Detection Process

8.) On-Line Manual Test

9.) State Voter Record

10.) Pre-election Test Record

11.) Start Vote

12.) End Vote

13.) Certify Vote

14.) Security Alert

15.) Power Failure

16.) System Restart

17.) Commands

18.) Communication Processes

19.) Voter Help Processes

20.) System Shut Down Command

Figure 9:
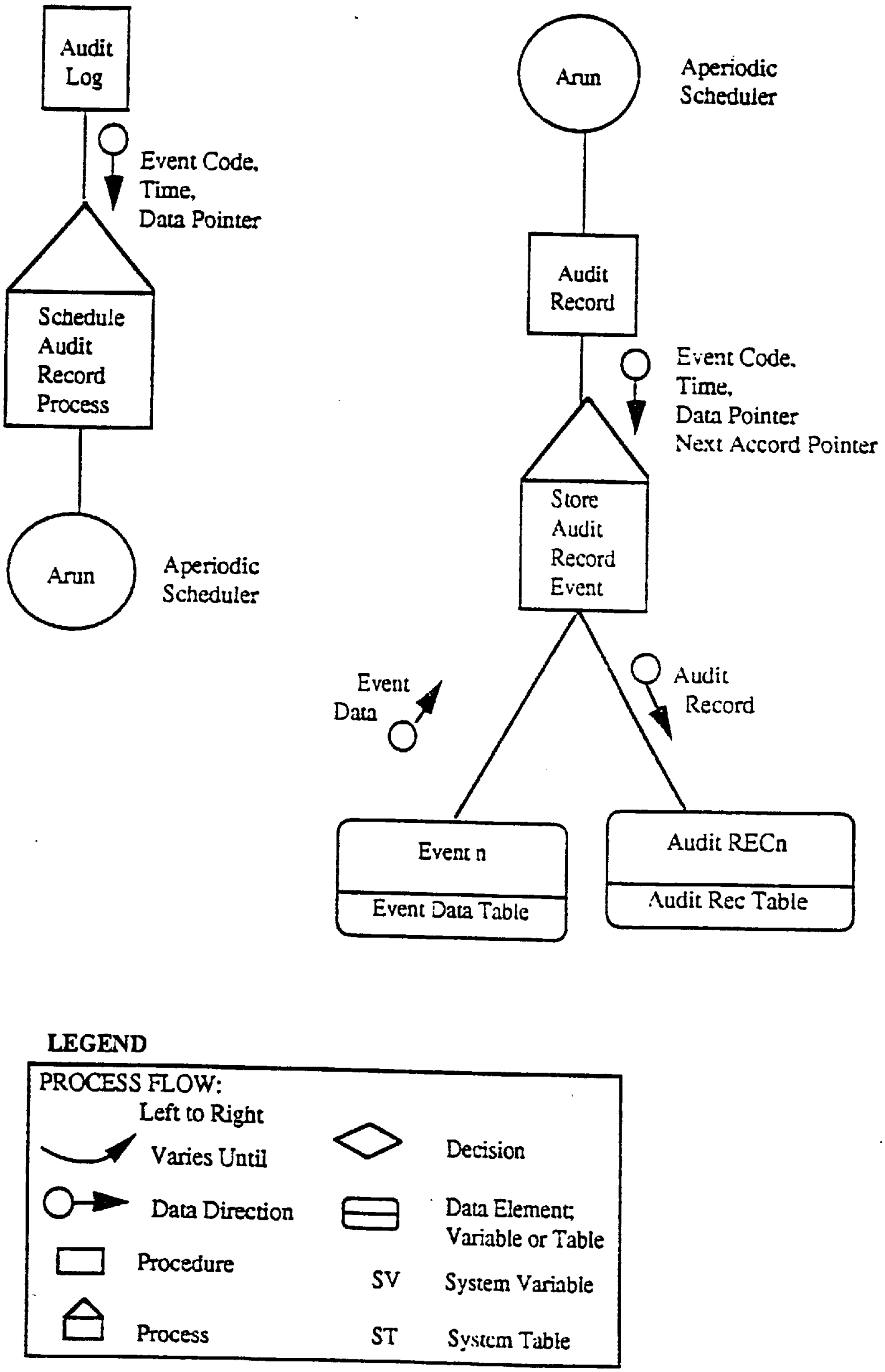

The data which comprises the audit trail can be used to completely reproduce all events occurring during the voting day. This audit trail can be reviewed during post election off-line processing in view of a legal challenge questioning the integrity of the election. This validates the operational integrity of the system during its operation and demonstrates system credibility. An exemplary process involved in generating the audit trail is shown in FIG. 9. The processes invoked during operation of the system initiate an audit log procedure to schedule an audit record processing function. When audit log data is combined with the voter record information, a complete audit of every precinct event can be reproduced whereby the operational integrity of the system can be verified and validated by an analysis of the operating historical records contained in the audit trail.

Figure 10:
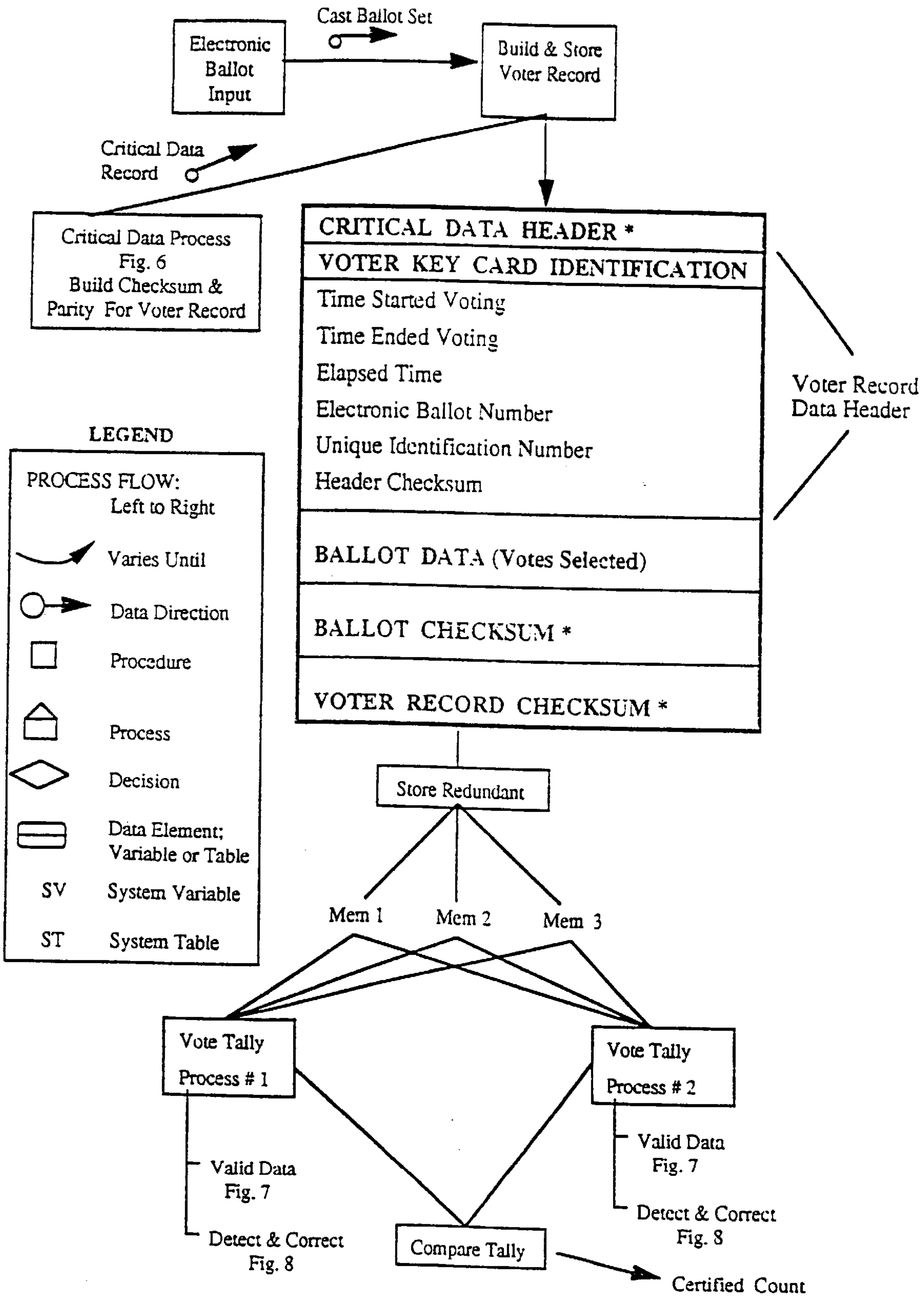
FIG. 10 depicts an exemplary process for redundantly storing critical data.

Another aspect of the present invention involves use of the redundantly recorded individual voter records to ensure accurate and true election results. This process is shown in FIG. 10. The vote tallying process operates using two or more separate processes to tally the votes. These separate processes produce a tally of each race from the voter records. These totals are then compared, and if equal, result in a certified election result. The purpose of this method is to ensure that the vote tally process has no logical errors that could cause an incorrect election tally. In practice, the two or more tally procedures would differ to ensure that while the tally function is the same, the actual logical processing used to check and total the votes is different. Alternatively, data can stored in a slightly different form in each of the redundant memories such that a single logical tallying process produces a same result from each copy if no tampering has occurred. These methods reduce the possibility of logical errors going undetected.

The redundant storage of voter records provides additional system security since votes are preferably tallied from more than one record. A system that maintains a running total could be subject to fraud by tampering if the vote totals are adjusted. However, to effectively tamper with the present system, each vote in each redundant memory would have to be found and individually adjusted to avoid detection by tallying logic. This is a near impossible task since many copies of each record are maintained throughout the system and each also contains unique checksums and parity data. Additional protection of the critical voter record data is afforded through the use of separate memory systems and/or devices that contain redundant copies of the voter records and the audit log data that shows how each individual voter record was processed by the system. The specific critical data process is preferably altered for each election (e.g., through software program instructions) so that a tamperer cannot reverse engineer the security methods and successfully tamper with data stored in a subsequent election.

Exemplary applications of the invention have been described. However, one skilled in the art will readily appreciate and recognize that the audio ballot system in accordance with the invention can be configured in any of a variety of ways using off the shelf or design specific components. Interconnection of such components can be accomplished in any of a number of ways to achieve a desired result. Furthermore it will be readily apparent to skilled artisans that the particular order and style of candidate/issue presentation and voter input detection is discretionary. For example, a wide variety of selection input techniques and sequences can be employed depending on the design of the voter input device and its method of operation in view of the format and timing scenarios involved with announcing candidate/issue information. Any and all permutations of the audio output non-visual input scenario are considered to be within the scope of the appended claims.

The invention has been described with reference to particular embodiments. However, it will be readily apparent to those skilled in the art that it is possible to embody the invention in specific forms other than those of the embodiments described above. Embodiment of the invention in ways not specifically described may be done without departing from the spirit of the invention. Therefore, the preferred embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. An electronic voting system comprising:

means for audibly providing a voter with ballot choices;

means for permitting the voter to indicate a selected ballot choice;

means for audibly informing the voter of said selected ballot choice by announcing an identity of the selected ballot choice;

means for allowing said voter to change said selected ballot choice; and means responsive to the means for permitting the vote to indicate a selected ballot choice for recording the selected ballot choice.

2. The system claimed in claim 1 wherein said means for audibly providing ballot choices is capable of supplying the ballot choices in any one language of a plurality of languages.

3. The system claimed in claim 2 wherein said one language is selectable by the voter.

4. The system claimed in claim 1 wherein said means for permitting the voter to indicate a selected ballot choice includes a manually operably device having a single switch which can be used repeatedly by said voter to make plural ballot selections.

5. The system claimed in claim 4 wherein said manually operable device is hand-held.

6. The system claimed in claim 1 wherein said means for permitting the voter to indicate a selected ballot choice includes a microphone.

7. The system claimed in claim 6 wherein said means for permitting the voter to indicate a selected ballot choice further includes a voice recognition system.

8. The system claimed in claim 7, wherein the voice recognition system includes means for recording a write-in candidate name spoken by the voter.

9. The system claimed in claim 7 wherein said voice recognition system includes a calibration means wherein at least one of a positive and a negative indication is recorded.

10. The system claimed in claim 9 wherein at least one of the positive and the negative indication is compared to a voice response supplied by the voter in response to the ballot choices.

11. The system claimed in claim 1 wherein said means for permitting the voter to indicate a selected ballot choice.

12. The system claimed in claim 11, wherein said time sensitive response mechanism records a response supplied during a predetermined period of time.

13. The system claimed in claim 12, wherein said time sensitive response mechanism reprompts the voter with an audibly detectable message informing the voter of an alternative course of action if a response is not supplied during the predetermined period of time.

14. The method claimed in 13, wherein the alternative course of action is selected from the group consisting of: presenting the voter with a next race; presenting the voter with a next candidate; reprompting the voter with the selection choice; ending the voting process; reviewing a ballot choice selection; and changing a ballot choice selection.

15. The system claimed in claim 1, wherein said system further comprises:

means for entering a write-in candidate.

16. The system claimed in claim 1, wherein said system further comprises:

means for reviewing all selected ballot choices recorded.

17. The system claimed in claim 16, wherein said system further comprises:

means for changing a selected ballot choice.

18. The system claimed in claim 1, wherein said system further comprises:

means for generating a first checksum based upon raw data associated with a ballot choice selection; and means for generating a data element that includes the raw data and the first checksum.

19. The system claimed in claim 18 wherein the data element is recorded by the means for recording.

20. The system claimed in claim 18, further comprising:

means for setting a parity bit data for each byte of raw data in the data element.

21. The system claimed in claim 18, wherein the data element includes a time tag corresponding to the voting event.

22. The system claimed in claim 21, wherein the data element includes a data type indicator, said data type indicator indicating whether said data element corresponds to a voter voting event or an audit trail recording event.

23. The system claimed in claim 22, wherein said data element includes a second checksum that is calculated based on at least the time tag and the data type indicator.

24. The system claimed in claim 23, wherein the data type indicator, the time tag, and the second checksum comprise a data element header.

25. The system claimed in claim 24, wherein the data element further comprises a data element checksum calculated based on at least the data element header, the parity bit data, and the first checksum.

26. The system claimed in claim 20, further comprising:

means for detecting an error in a data element, which means for detecting includes, means for regenerating a first checksum based upon raw data contained in the data element; and means for comparing the regenerated data checksum to the data checksum previously stored for the data element.

27. The system claimed in claim 26, further comprising:

means for correcting an error in a data element detected by the detecting means, which correcting means includes, means for regenerating the parity bits for each byte of raw data associated with the data checksum mismatch;

means for locating a byte that is in error by comparing regenerated parity bits with parity bits previously stored for the byte;

means altering each of the bits in the located byte and recalculating a data checksum until an altered byte used in the data checksum calculation results in a recalculated data checksum value that is equal to a data checksum value previously stored for the data element; and means for replacing the located byte in error with the altered byte that results in a data checksum match.

28. The system claimed in claim 1, wherein said system further comprises:

means for recording raw data associated with a system event.

29. The system of claim 28, wherein the system event is selected from the group consisting of: time of log entry, time of event occurrence, event category, system turn on, ballot access, ballot end access, vote entry, vote confirmation commanded, operator entry, maintenance monitor entry, failure detection process, on-line manual test, state voter record, pre-election test record, start vote, end vote, certify vote, security alert, power failure, system restart, commands, communication processes, voter help processes, and system shut down command.

30. A system for producing a record corresponding to a voting event, the system comprising:

means for prompting a voter with an audibly detectable invitation to enter a voting response;

means for permitting a voter to enter a response to the invitation in a manner which does not require visual interaction;

means for storing the response in a record; and means for translating the record into a form that is suitable for automated reading by a second system.

31. The system of claim 30, wherein the form is selected from the group consisting of: a formatted signal, a formatted data element, an optically scanable form, and a punch card.

32. A voting system comprising:

a ballot script containing ballot-specific information;

a speech generating device for interpreting the ballot script and for generating an audibly detectable signal that includes ballot information;

a voter input device for permitting a voter to orally enter a response to ballot information generated by the speech generation device;

a recording device for recording the response entered using the voter input device; and control logic for controlling the voting system.

33. A method for entering a response in an electronic voting system, the method comprising the steps of:

prompting a voter with an audibly detectable message informing the voter of a selection option;

permitting entry of a voter response in a manner which does not require visual interaction with the system;

recording a response tendered by the voter in response to the selection option;

audibly repeating said response; and allowing said voter to change the response as a result of said audibly repeating step.

34. The method claimed in 33, further comprising the steps of:

waiting a predetermined period of time following the prompting step;

executing the recording step if a response is tendered during the predetermined period of time; and reprompting the voter with an audibly detectable message informing the voter of an alternative course of action if a response is not tendered during the predetermined period of time.

35. The method claimed in 34, wherein the alternative course of action is selected from the group consisting of: presenting the voter with a next race; presenting the voter with a next candidate; reprompting the voter with the audibly detectable message informing the voter of the selection option; ending the voting process; reviewing a ballot choice selection; and changing a ballot choice selection.

* * * * *

US005821508C1

(12) EX PARTE REEXAMINATION CERTIFICATE (5499th)
United States Patent
Willard

(10) Number: US 5,821,508 C1
(45) Certificate Issued: Sep. 12, 2006

(54) AUDIO BALLOT SYSTEM

(75) Inventor: Jim Paul Willard, Gaithersburg, MD (US)

(73) Assignee: Votation, LLC, Chevy Chase, MD (US)

Reexamination Request:
No. 90/006,186, Jan. 10, 2002

Reexamination Certificate for:

| | |
|---|---|
| Patent No.: | **5,821,508** |
| Issued: | **Oct. 13, 1998** |
| Appl. No.: | **08/772,911** |
| Filed: | **Dec. 24, 1996** |

Related U.S. Application Data

(60) Provisional application No. 60/009,528, filed on Dec. 29, 1995.

(51) Int. Cl.
*G07C 13/00* (2006.01)
*G06F 17/60* (2006.01)

(52) U.S. Cl. ....................... 235/51; 235/386; 235/50 B; 235/50 R; 235/54 F

(58) Field of Classification Search .................. 235/51, 235/50 R, 50 B, 54 F, 386
See application file for complete search history.

(56) References Cited

U.S. PATENT DOCUMENTS

| | | | | |
|---|---|---|---|---|
| 3,940,565 A | | 2/1976 | Lindenberg | |
| 4,774,665 A | | 9/1988 | Webb | |
| 4,928,302 A | | 5/1990 | Kaneuchi et al. | |
| 5,054,053 A | | 10/1991 | Sakanishi et al. | |
| 5,245,610 A | | 9/1993 | Lindell | |
| 5,553,292 A | * | 9/1996 | Daly et al. | 710/260 |

OTHER PUBLICATIONS

Alternative Ballot Techniques Hearing Before the Subcommittee on Elections of the Committee On House Administration House of Representatives 103rd Cong (Sep. 22, 1994) (1995).
Carbone, Comparison of Novell Netware and TCP/IP Protocol Architectures (Jul. 16, 1995).
Saltman, R G , Vote–by–Phone—Pitfalls and Promises, The Risks Dieges, vol. 11: Issue 75 (May 29, 1991).
Performance and Test Standards For Punchcard, Marsense, and Direct Reocording Electronic Voting Systems, Federal Election Commission (Jan. 1990).

* cited by examiner

*Primary Examiner*—Karl D. Frech

(57) ABSTRACT

An electronic voting system is disclosed that provides voters who may be blind, illiterate, or conversant in a foreign language, with a means to enter selection information without having to rely on visually perceptible information. In accordance with exemplary embodiments, candidate and/or referendum information is supplied audibly such that the voter can respond to selection options by speech input, actuating a button on a hand-held device, or other mechanism that permits the voter to indicate his or her selection preferences without having to visually interact with the system. The system provides an audio confirmation of the voter's selection. Such a system allows the aforementioned individuals to vote in confidence without assistance.

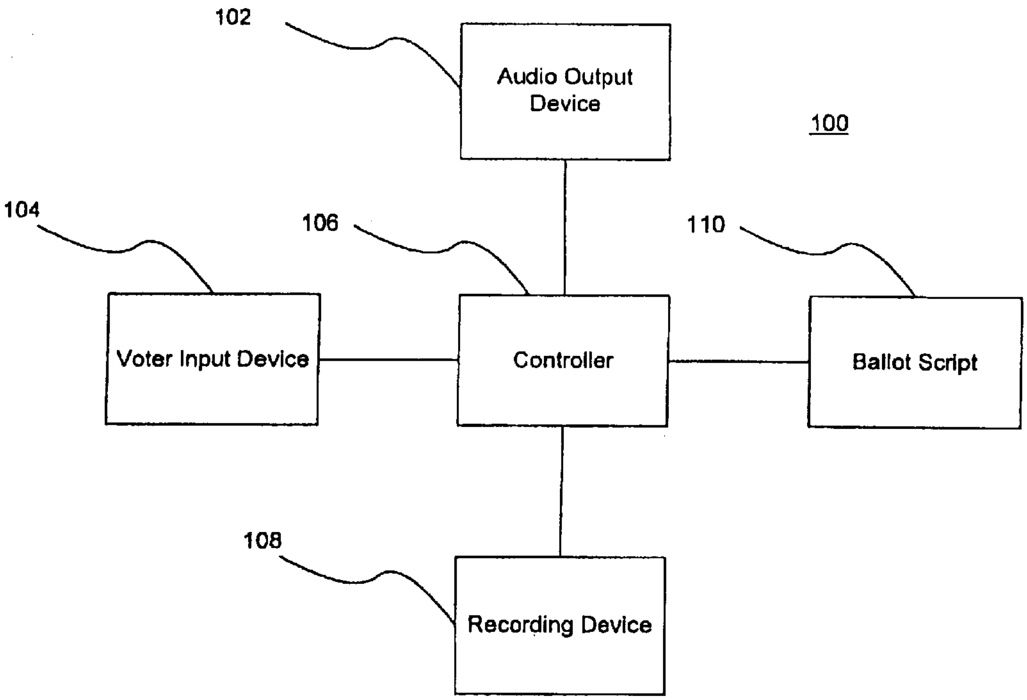

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–35 are cancelled.

* * * * *